US009809127B2

(12) United States Patent
Duhaime et al.

(10) Patent No.: US 9,809,127 B2
(45) Date of Patent: Nov. 7, 2017

(54) COMPACT INTEGRATED BATTERY PACKS FOR HYBRID VEHICLES

(71) Applicants: Michael L Duhaime, Northville, MI (US); Steven L Clark, Birmingham, MI (US); Oliver Gross, Oxford, MI (US)

(72) Inventors: Michael L Duhaime, Northville, MI (US); Steven L Clark, Birmingham, MI (US); Oliver Gross, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 300 days.

(21) Appl. No.: 14/574,583

(22) Filed: Dec. 18, 2014

(65) Prior Publication Data

US 2016/0176312 A1    Jun. 23, 2016

(51) Int. Cl.
*B60L 11/18* (2006.01)
*B60K 6/405* (2007.10)
(Continued)

(52) U.S. Cl.
CPC .......... *B60L 11/1874* (2013.01); *B60K 6/405* (2013.01); *B60L 1/00* (2013.01); *B60L 11/1811* (2013.01); *B60L 11/1877* (2013.01); *B60L 11/1879* (2013.01); *H01M 2/1077* (2013.01); *H01M 10/425* (2013.01); *H01M 10/613* (2015.04); *H01M 10/625* (2015.04);
(Continued)

(58) Field of Classification Search
CPC ............... H01M 10/613; H01M 10/10; H01M 10/5016; H01M 2220/20; H01M 10/6567; H01M 10/6581
USPC ......................................................... 307/9.1
See application file for complete search history.

(56) References Cited

U.S. PATENT DOCUMENTS

| 5,639,571 A | 6/1997 | Waters et al. |
| 8,393,426 B2 | 3/2013 | Takahashi et al. |

(Continued)

FOREIGN PATENT DOCUMENTS

| DE | 102012205109 A1 | 10/2013 |
| EP | 153885 A2 | 6/2005 |
| EP | 2530206 A1 | 12/2012 |

OTHER PUBLICATIONS

International Search Report and Written Opinion dated Dec. 14, 2015 for International Application No. PCT/US2015/065478, International Filing Date Dec. 14, 2015.

*Primary Examiner* — Robert Deberadinis
(74) *Attorney, Agent, or Firm* — Ralph E. Smith

(57) ABSTRACT

Compact integrated battery packs for hybrid vehicles are fully integrated with an on-board cooling system and include both the battery cells for supplying a primary voltage, such as powering a belt-driven starter generator (BSG) unit for engine start/stop, as well as a direct current (DC) to DC converter for stepping down the primary voltage to a secondary voltage for powering low voltage components and/or recharging a lead-acid battery. The on-board DC to DC converter decreases packaging size and eliminates the need for an alternator, which further decreases packaging size. Primary and secondary voltage output ports can also be implemented for quick and easy connection to other components. Configurations include single-layer and dual-layer arrangements with integrated air or liquid cooling for placement in or beneath a trunk of a vehicle, behind or beneath seats in a cab of a pickup truck, and/or beneath a vehicle.

15 Claims, 2 Drawing Sheets

(51) Int. Cl.
*B60L 1/00* (2006.01)
*H02J 7/24* (2006.01)
*H01M 10/625* (2014.01)
*H01M 10/613* (2014.01)
*H01M 2/10* (2006.01)
*H01M 10/42* (2006.01)
*H01M 10/6567* (2014.01)
*B60K 1/00* (2006.01)
*H01M 10/6561* (2014.01)

(52) U.S. Cl.
CPC ........ *H02J 7/248* (2013.01); *B60K 2001/005* (2013.01); *B60L 2210/12* (2013.01); *B60L 2210/14* (2013.01); *H01M 10/6561* (2015.04); *H01M 10/6567* (2015.04); *H01M 2220/20* (2013.01); *Y02T 10/705* (2013.01); *Y02T 10/7016* (2013.01); *Y02T 10/7225* (2013.01); *Y02T 10/7233* (2013.01); *Y10S 903/907* (2013.01)

(56) References Cited

U.S. PATENT DOCUMENTS

| | | | |
|---|---|---|---|
| 8,446,035 | B2 | 5/2013 | Tsuchiya et al. |
| 8,704,401 | B2 | 4/2014 | Kato et al. |
| 9,331,318 | B2* | 5/2016 | Wood .................. H01M 2/1072 |
| 9,496,588 | B2* | 11/2016 | Nguyen .............. H01M 10/625 |
| 2009/0014221 | A1 | 1/2009 | Kim et al. |
| 2009/0103341 | A1* | 4/2009 | Lee ........................ H02J 7/022 |
| | | | 363/124 |
| 2011/0186365 | A1 | 8/2011 | Abadia et al. |
| 2012/0129440 | A1 | 5/2012 | Kitaguchi et al. |
| 2012/0292987 | A1 | 11/2012 | Rutkowski et al. |
| 2013/0192807 | A1 | 8/2013 | Dekeuster |
| 2014/0186675 | A1* | 7/2014 | Boettcher ........... H01M 2/1077 |
| | | | 429/99 |

\* cited by examiner

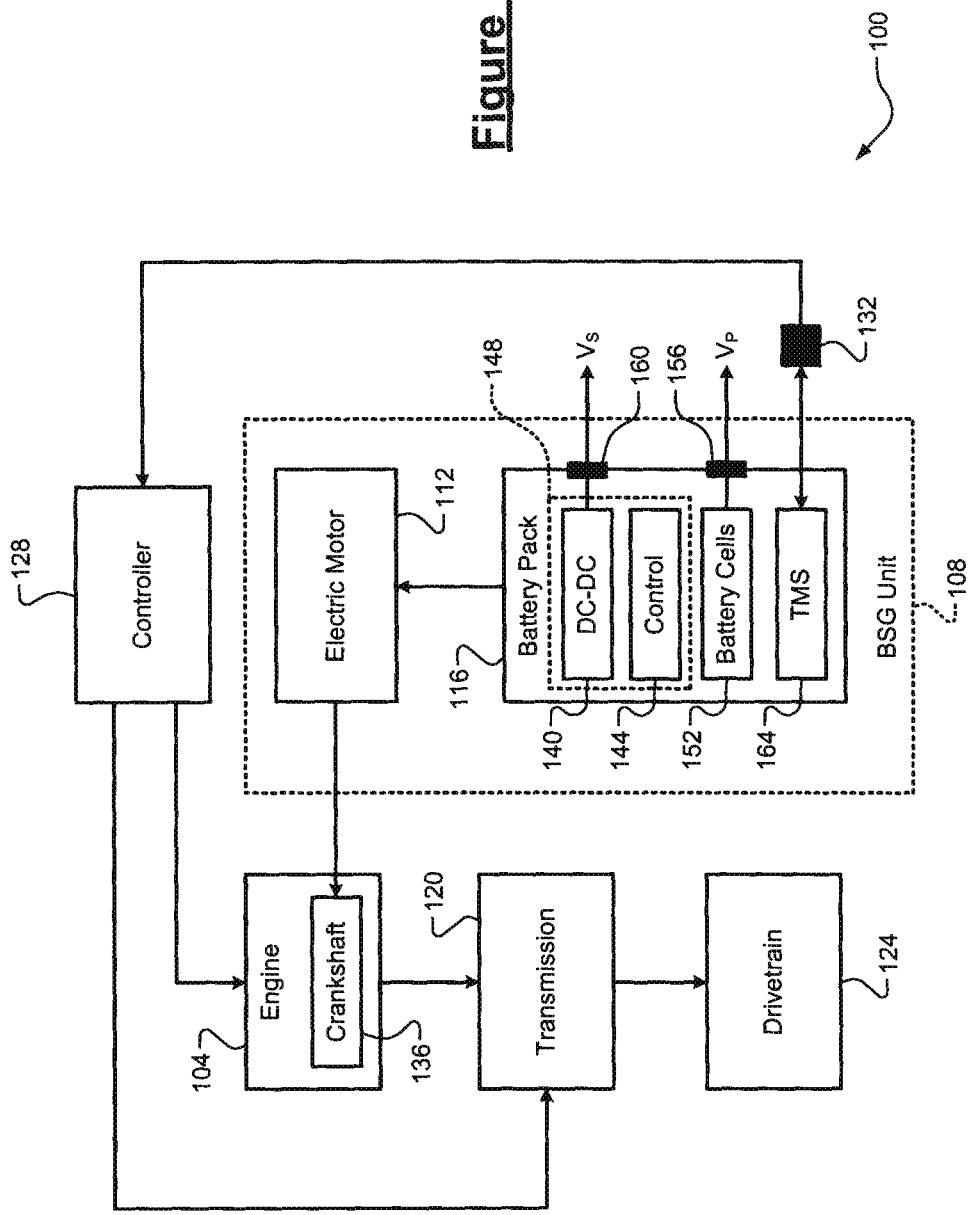

COMPACT INTEGRATED BATTERY PACKS FOR HYBRID VEHICLES

FIELD

The present application relates generally to hybrid vehicles and, more particularly, to compact integrated battery packs for hybrid vehicles.

BACKGROUND

A mild hybrid vehicle is one type of hybrid vehicle that includes an engine configured for propulsion and an electric motor configured to assist the engine. One type of mild hybrid vehicle includes a belt-driven starter generator (BSG) unit. The BSG unit utilizes the electric motor to selectively provide power to a crankshaft of the engine (e.g., via a belt). The BSG also replaces a conventional alternator and thus could be used for start-stop of the engine, power assist, and/or regenerative braking, as well as powering other vehicle components. The BSG unit is powered by a battery pack, such as a 48 volt battery pack.

Conventional battery packs have external or off-board controllers and/or direct current (DC) to DC converters. This increases packaging size and/or weight for the battery pack. Conventional cooling systems capable of handling cooling needs of the battery pack, such as a heating, ventilation, and air conditioning (HVAC) system or another refrigerant-based system could also increase packaging size and/or weight. Further, conventional packaging of all of these distinct components wastes additional vehicle space. Therefore, while such battery packs work for their intended purpose, there remains a need for improvement in the relevant art.

SUMMARY

In accordance with an aspect of the invention, a compact integrated battery pack for a hybrid vehicle is presented. In one exemplary implementation, the battery pack includes a housing, a plurality of battery cells disposed within the housing and configured to collectively output a primary voltage for powering an electric motor of the hybrid vehicle, a direct current (DC) to DC converter circuit disposed within the housing and configured to step-down the primary voltage to a secondary voltage for powering low voltage components of the hybrid vehicle, and a control circuit disposed within the housing and configured to control (i) recharging of the plurality of battery cells, (ii) output of the primary voltage, and (iii) output of the secondary voltage, and an integrated cooling system disposed within the housing and configured to cool the battery pack.

In some implementations, the DC to DC converter circuit and the control circuit are both implemented on a single common circuit board disposed within the housing. In some implementations, the DC to DC converter is further configured to boost the secondary voltage or another received secondary voltage to the primary voltage or another boosted primary voltage for at least one of (i) recharging the plurality of battery cells and (ii) powering the electric motor of the hybrid vehicle.

In some implementations, the cooling system is an air cooling system disposed within the housing and configured to utilize air from inside the hybrid vehicle to cool the battery pack. In some implementations, the hybrid vehicle is a sedan or coupe and the housing is sized and shaped to define dimensions corresponding to a space (i) in a trunk of the sedan or the coupe or (ii) beneath a floor of the trunk, the plurality of battery cells and the control circuit are arranged in a first component layer in the housing, and the DC to DC converter and the air cooling system are arranged in a second distinct component layer within the housing that is proximate and parallel to the first component layer. In other implementations, the hybrid vehicle is a pickup truck and the housing is sized and shaped to define dimensions corresponding to a space (i) behind seats in a cab of the pickup truck or (ii) under the seats in the cab, and the plurality of battery cells, the control circuit, the DC to DC converter, and the air cooling system are each arranged in a single component layer in the housing.

In other implementations, the cooling system is a liquid cooling system disposed within the housing and configured to utilize a liquid coolant to cool the battery pack. In some implementations, the hybrid vehicle is a sport utility vehicle and the housing is sized and shaped to define dimensions corresponding to a space underneath the sport utility vehicle. In some implementations, the plurality of battery cells, the control circuit, the DC to DC converter, and the liquid cooling system are each arranged in a single component layer in the housing. In some implementations, the battery pack further includes one or more seals configured to prevent moisture from entering the housing such that the battery pack is positionable underneath the hybrid vehicle in an area exposable to water, and one or more cooling lines configured to provide the liquid coolant from an outside of the housing to the liquid cooling system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is an example functional block diagram of a hybrid vehicle including a battery pack according to the principles of the present disclosure.

DESCRIPTION

Figure 2A:
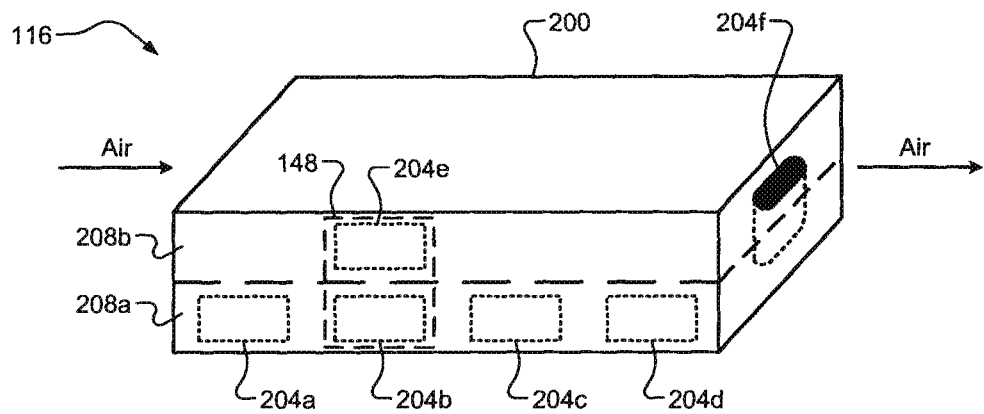
FIGS. 2A-2C are example diagrams of various configurations of the battery pack according to the principles of the present disclosure.

As previously discussed, there remains a need for improved battery pack construction and packaging for hybrid vehicles. Accordingly, compact, integrated battery packs for hybrid vehicles are presented. These battery packs are fully integrated having both the plurality of battery cells for supplying a primary voltage, such as for powering a belt-driven starter generator (BSG) unit, as well as a direct current (DC) to DC converter for stepping down the primary voltage to a lower secondary voltage for powering low voltage vehicle components and/or recharging a lead-acid or other suitable vehicle battery. Having the DC to DC converter on-board decreases packaging size and eliminates the need for an alternator. In one exemplary implementation, the DC to DC converter circuit and a control circuit for the battery pack are implemented on a single common circuit board, thereby further decreasing packaging size. Primary and secondary voltage output ports can also be implemented in or on the battery pack for quick and easy connection to other components.

Various configurations of the fully integrated battery pack provide for compact dimensions that allow the battery pack to be placed outside of the engine compartment (which typically has very little or no free space) and in other typically unused spaces of the vehicle. Examples of these compact configurations include an air-cooled single layer configuration for placement behind or below seats in a cab of a pickup truck and a liquid-cooled single layer configuration for placement below a sport utility vehicle (including cooling lines and seal(s)). Another example of these compact configurations includes an air-cooled dual layer configuration for placement below a floor of a trunk of a sedan, a coupe, or another conventional passenger vehicle. Specific arrangement of the components within the housing of the battery pack can depend on interaction between the components (e.g., sharing of a single common circuit board) and/or cooling requirements (e.g., heat-sensitive battery cells located closer to the cooling system).

Referring now to FIG. 1, an example functional block diagram of a vehicle 100 is illustrated. In one exemplary implementation, the vehicle is a mild hybrid vehicle. The vehicle 100 includes an engine 104 and a BSG unit 108 comprising an electric motor 112 and a battery pack 116. While a BSG hybrid configuration for the vehicle 100 is illustrated and described herein, it will be appreciated that the vehicle 100 could be any suitable electrified vehicle, such as a vehicle 100 having an integrated starter generator (ISG) hybrid configuration or another form of electric motor 112. In one exemplary implementation, the vehicle 100 could be a battery electric vehicle (BEV) or plug-in hybrid electric vehicle (PHEV) utilizing the electric motor 112 and the battery pack 116 at least partially for propulsion of the vehicle 100 and the engine 104 for recharging the battery pack 116. The vehicle 100 also includes a transmission 120, a drivetrain 124, a controller 128, and a temperature sensor 132 configured to measure a temperature of the battery pack 116.

The engine 104 is any suitable internal combustion engine (gasoline, diesel, etc.) configured to generate drive torque. The drive torque is transferred to the drivetrain 124 via the transmission 120. Under certain operating conditions, the controller 128 commands the engine 104 to stop. Examples of these operating conditions are the vehicle 100 being stopped for a period, such as at a red light. Once the operating condition changes, the controller 124 commands the engine 104 to restart by commanding the BSG unit 108 to restart the engine 104. Examples of inputs for detecting these operating conditions include vehicle speed, accelerator pedal position, and brake pedal position. This starting and restarting of the engine 104 is also known as "start-stop operation." The BSG unit 108 provides for faster restarts of the engine 104, and thus a driver of the vehicle 100 is unaware or less aware that the engine 104 is ever stopped.

Specifically, the BSG unit 108 is configured to selectively provide power to a crankshaft 136 of the engine 104. Thus, the BSG unit 108 is arranged in place of a conventional alternator (not shown) of the engine 104. The BSG unit 108, therefore, further includes a direct current (DC) to DC converter 140. The DC-DC converter 140 is configured to step-down a primary voltage ($V_P$) of the battery pack 116 to a lower secondary voltage ($V_S$) suitable for powering components of the vehicle 100 and/or recharging a 12 volt lead-acid battery. The battery pack 116 includes a plurality of battery cells 152 that collectively output the primary voltage (e.g., approximately 48 volts), such as via a primary voltage output port 156 of the battery pack 116. The secondary voltage could also be output via a similar secondary voltage output port 160 of the battery pack 116. Similarly, voltages could be input via these ports 156, 160. In one exemplary implementation, the DC to DC converter 140 is further configured to boost the secondary voltage $V_S$ or another received secondary voltage to the primary voltage ($V_P$) or another boosted primary voltage for at least one of (i) recharging the plurality of battery cells 152 and (ii) powering the electric motor 112 of the vehicle 100.

Because the battery cells 152 are temperature-sensitive, the battery pack 116 also includes a thermal management system ("TMS") or cooling system 164. Depending on the configuration and/or placement of the battery pack 116 in the vehicle 100, the cooling system 164 could be an air cooling system or a liquid cooling system. An air configuration for the cooling system 164 could utilize air within the vehicle 100 (within a cabin of the vehicle 100, within a trunk of the vehicle 100, etc.) for cooling the battery pack 116. Similarly, a liquid configuration for the cooling system 164 could use a liquid refrigerant or other conditioned or non-conditioned cooling liquid (e.g., glycol or a water/glycol mixture). The arrangement of all of these components discussed above also creates packaging issues due to limited vehicle space, such as limited engine compartment space. In one exemplary implementation, the configurations of the cooling system 164 could use one or more channels (see, e.g., FIGS. 2A-2C) defined by a housing of the battery pack 116 to cool various components of the battery pack 116 (e.g., by removing heat therefrom), which is discussed in greater detail below.

Figure 2B:
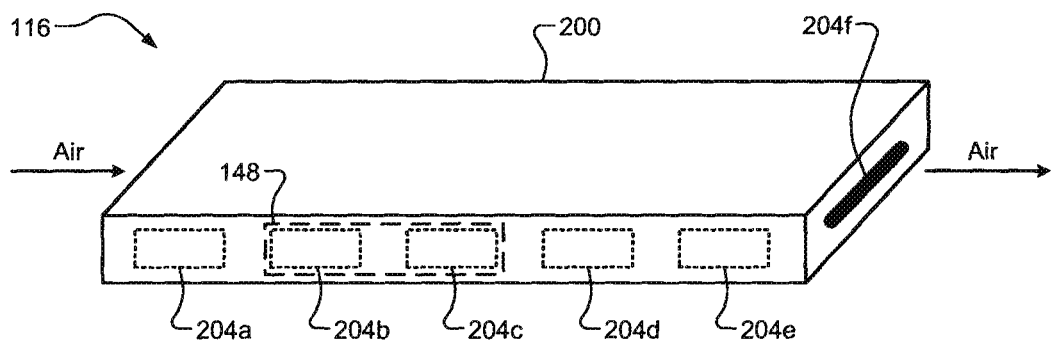
Figure 2C:
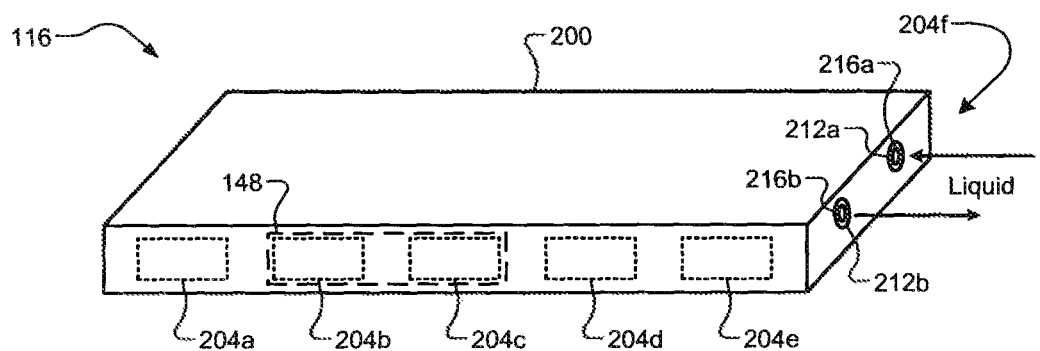

Referring now to FIGS. 2A-2C, various configurations of the battery pack 116 are illustrated. Each configuration of the battery pack 116 includes a housing 200 that is sized and shaped to define specific dimensions of the battery pack 116. One example material for the housing 200 is a lightweight metal, such as aluminum. The housing 200 could also include materials that insulate the battery pack 116 from moisture and/or heat. For each configuration of the battery pack 116, the DC to DC converter circuit 140, the control circuit 144, the plurality of battery cells 152, the primary voltage output port 156, the secondary voltage output port 160, and the cooling system 164 are all disposed within the housing 200. While the primary voltage port 156 and the secondary voltage port 160 are typically used for discharging (i.e., providing power to other components), it will be appreciated that recharging of the plurality of battery cells 152 could occur via one or both of the primary voltage port 156 and the secondary voltage port 160.

In FIG. 2A, components 204a-204f (collectively "components 204") are disposed within the housing 200 in first and second layers 208a and 208b, respectively. These layers 208a and 208b are generally parallel and thus represent a stack of the components 204. In one exemplary implementation, the first and second layers 208a and 208b are distinct layers. In one exemplary implementation, components 204e and 204f in the second layer 208b represent the DC to DC converter circuit 140 and the cooling system 164, respectively. In this one exemplary implementation, components 204b and 204c could be the control circuit 144 (e.g., optionally implemented on the single common circuit board 148 with the DC to DC converter circuit 140) and the plurality of battery cells 152, respectively. Components 204a and 204d could then represent the primary and secondary voltage output ports 156 and 160.

Other suitable arrangements of this exemplary configuration could also be utilized, such as arranging the plurality of battery cells 152 as component 204e in the second layer 208b to provide for improved cooling because the plurality of battery cells 152 could be more temperature sensitive than the DC to DC converter circuit 140. Components 204b and 204c in layer 208a could then be the DC to DC converter circuit 140 and the control circuit 144 (e.g., optionally implemented on the single common circuit board 148 with the DC to DC converter circuit 140), such as shown in FIG. 2B. In one exemplary implementation, the cooling system 164 could be positioned as one or more channels in the second layer 208b or in the second layer 208b and spanning or extending into the first layer 208a. The housing 200 in this exemplary configuration is sized and shaped to define dimensions corresponding to a space below a trunk in a sedan or coupe configuration of the vehicle 100. While the terms sedan, coupe, and conventional passenger vehicle as used herein do not include pickup truck or a sport utility vehicle, this configuration could also be utilized by a pickup truck or sport utility vehicle (e.g., in or beneath a trunk of the sport utility vehicle). By packaging the battery pack 116 such that it could fit in or beneath a floor of a trunk of the vehicle 100, vehicle space is maintained and engine compartment space is reduced. In this exemplary configuration, air could be provided to the cooling system 164 from the trunk, from a cabin of the vehicle 100, from an exterior of the vehicle 100, and/or from a heating, ventilation, and air conditioning (HVAC) system of the vehicle 100.

In FIG. 2B, the components 204 are disposed within the housing 200 in a generally parallel manner (e.g., in a single layer). In one exemplary implementation, a neighboring pair of the components 204, such as components 204b and 204c, could be the DC to DC converter circuit 140 and the control circuit 144 (e.g., optionally implemented on the single common circuit board 148). The plurality of battery cells 152 could also be located proximate the DC to DC converter circuit 140 and/or proximate the cooling system 164 (e.g., component 204f) for improved cooling. In this exemplary configuration, the housing 200 is sized and shaped to define dimensions corresponding to a space (i) behind seats in a cab of the pickup truck configuration of the vehicle 100 or (ii) under the seats in the cab of the pickup truck configuration of the vehicle 100. By packaging the battery pack 116 such that it could fit behind or below seats in the vehicle 100, vehicle space is maintained and engine compartment space is reduced. In this exemplary configuration, air could be provided to the cooling system 164 from the cab of the vehicle 100 or from an exterior of the vehicle 100.

In FIG. 2C, the components 204 are again disposed within the housing 200 in a generally parallel manner (e.g., in a single layer). In one exemplary implementation, a neighboring pair of the components 204, such as components 204b and 204c, could be the DC to DC converter circuit 140 and the control circuit 144 (e.g., optionally implemented on the single common circuit board 148). The plurality of battery cells 152 could also be located proximate the DC to DC converter circuit 140 and/or proximate the cooling system 164 (e.g., component 204f) for improved cooling. In this exemplary configuration, the housing 200 is sized and shaped to define dimensions corresponding to a space below a sport utility configuration of the vehicle 100. By packaging the battery pack 116 such that it could fit below the vehicle 100, vehicle space is maintained and engine compartment space is reduced.

In this exemplary configuration, liquid coolant could be provided to the cooling system 164 (represented again as 204f) from an exterior of the battery pack 116 via cooling lines 212a and 212b (collectively "cooling lines 212") having seals 216a and 216b (collectively "seals 216"), respectively. While seals 216a and 216b are shown with respect to the cooling lines 212a and 212b, it will be appreciated that one or more seals could be applied to the battery pack 116 in general to prevent moisture from entering the housing 200, such that the battery pack 116 could be subject to the atmosphere underneath the vehicle 100, including being exposed to or at least partially submerged in water or another liquid.

While the configurations of FIGS. 2A-2C are discussed with respect to specific types of vehicles (sedan, pickup truck, sport utility vehicle, etc.), it will be appreciated that these configurations or other similar configurations could be applied to these vehicles or to other types of vehicles. For example only, as previously mentioned, the configuration in FIG. 2A could be implemented in a trunk or cargo area of a sport utility vehicle. Furthermore, while these configurations are provided as examples, the techniques for arrangement of the components 204 as discussed herein could be applied to obtain other configurations based on size and space requirements for fitting the housing 200 in a type of vehicle.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A compact integrated battery pack for a hybrid vehicle, the battery pack comprising:
    a housing;
    a plurality of battery cells disposed within the housing and configured to collectively output a primary voltage for powering an electric motor of the hybrid vehicle;
    a direct current (DC) to DC converter circuit disposed within the housing and configured to step-down the primary voltage to a secondary voltage for powering low voltage components of the hybrid vehicle;
    a control circuit disposed within the housing and configured to control (i) recharging of the plurality of battery cells, (ii) output of the primary voltage, and (iii) output of the secondary voltage; and
    an integrated cooling system disposed within the housing and configured to cool the battery pack.

2. The battery pack of claim 1, wherein the DC to DC converter circuit and the control circuit are both implemented on a single common circuit board disposed within the housing.

3. The battery pack of claim 1, wherein the cooling system comprises an air cooling system disposed within the housing and configured to utilize air from inside the hybrid vehicle to cool the battery pack.

4. The battery pack of claim 3, wherein the hybrid vehicle is a sedan or coupe and the housing is sized and shaped to define dimensions corresponding to a space (i) in a trunk of the sedan or the coupe or (ii) beneath a floor of the trunk.

5. The battery pack of claim 4, wherein the plurality of battery cells and the control circuit are arranged in a first component layer in the housing, and wherein the DC to DC converter and the air cooling system are arranged in a second distinct component layer within the housing that is proximate and parallel to the first component layer.

6. The battery pack of claim 3, wherein the hybrid vehicle is a pickup truck and the housing is sized and shaped to define dimensions corresponding to a space (i) behind seats in a cab of the pickup truck or (ii) under the seats in the cab.

7. The battery pack of claim 6, wherein the plurality of battery cells, the control circuit, the DC to DC converter, and the air cooling system are each arranged in a single component layer in the housing.

8. The battery pack of claim 1, wherein the cooling system comprises a liquid cooling system disposed within the housing and configured to utilize a liquid coolant to cool the battery pack.

9. The battery pack of claim 8, wherein the hybrid vehicle is a sport utility vehicle and the housing is sized and shaped to define dimensions corresponding to a space underneath the sport utility vehicle.

10. The battery pack of claim 9, wherein the plurality of battery cells, the control circuit, the DC to DC converter, and the liquid cooling system are each arranged in a single component layer in the housing.

11. The battery pack of claim 9, further comprising:
one or more seals configured to prevent moisture from entering the housing such that the battery pack is positionable underneath the hybrid vehicle in an area exposable to water; and
one or more cooling lines configured to provide the liquid coolant from an outside of the housing to the liquid cooling system.

12. The battery pack of claim 1, wherein the DC to DC converter is further configured to boost the secondary voltage or another received secondary voltage to the primary voltage or another boosted primary voltage for at least one of (i) recharging the plurality of battery cells and (ii) powering the electric motor of the hybrid vehicle.

13. A mild hybrid vehicle, comprising:
an engine configured to generate drive torque at a crankshaft;
a belt-driven starter generator (BSG) unit comprising (i) an electric motor configured to provide drive torque to the crankshaft to start the engine and (ii) a battery pack configured to power the BSG unit, the battery pack comprising:
a housing;
a plurality of battery cells fully disposed within the housing, the plurality of battery cells configured to collectively generate a primary voltage for powering the electric motor;
a single circuit board fully disposed within the housing and having disposed thereon both:
a direct current to direct current (DC-DC) converter circuit configured to step-down the primary voltage to a secondary voltage for powering one or more low voltage components of the mild hybrid vehicle; and
a control circuit configured to control the DC-DC converter circuit and the output, from the battery pack, of the primary voltage and the secondary voltage; and
an integrated cooling system fully disposed within the housing, the cooling system being configured to cool the battery pack.

14. The mild hybrid vehicle of claim 13, wherein the vehicle does not include an alternator.

15. The mild hybrid vehicle of claim 13, wherein the primary voltage is approximately 48 volts and the secondary voltage is approximately 12 volts.

* * * * *